United States Patent [19]
Kim

[11] Patent Number: 6,107,754
[45] Date of Patent: Aug. 22, 2000

[54] ELECTRONIC BALLAST FOR HIGH-INTENSITY DISCHARGE LAMP AND METHOD OF DRIVING HIGH-INTENSITY DISCHARGE LAMP

[75] Inventor: Joong Seong Kim, Kyeongki-Do, Rep. of Korea

[73] Assignee: Inlight Co., Ltd., Rep. of Korea

[21] Appl. No.: 09/339,307

[22] Filed: Jun. 23, 1999

[30] Foreign Application Priority Data

Jan. 2, 1999 [KR] Rep. of Korea ........................ 1999-30

[51] Int. Cl.[7] ...................................................... G05F 1/00
[52] U.S. Cl. ........................... 315/291; 315/307; 315/308; 315/209 R
[58] Field of Search ................................ 315/209 R, 289, 315/290, 291, 307, 308, 360, 362, 194, DIG. 7, 224

[56] References Cited

U.S. PATENT DOCUMENTS

| | | | |
|---|---|---|---|
| 5,428,268 | 6/1995 | Melis et al. ................................ | 315/247 |
| 5,463,283 | 10/1995 | Sanderson ............................ | 315/209 R |
| 5,907,223 | 5/1999 | Gu et al. .................................. | 315/247 |
| 5,923,128 | 7/1999 | Canova .................................... | 315/291 |
| 5,925,984 | 7/1999 | Fischer et al. ........................... | 315/219 |
| 5,932,976 | 8/1999 | Maheshwari et al. ................... | 315/291 |
| 5,952,794 | 9/1999 | Bergman et al. ........................ | 315/307 |
| 6,008,594 | 12/1999 | Kita et al. ................................ | 315/307 |
| 6,020,691 | 2/2000 | Sun et al. ................................. | 315/307 |

OTHER PUBLICATIONS

Article: "White–Noise Modulation of High–Frequency High–Intensity Discharge Lamp Ballasts" (IEEE Transactions On Industry Applications, vol. 34, No.3, May/Jun. 1998).

*Primary Examiner*—Don Wong
*Assistant Examiner*—Trinh Vo Dinh
*Attorney, Agent, or Firm*—Ostrolenk, Faber, Gerb & Soffen, LLP

[57] ABSTRACT

The electronic ballast includes a power source circuit for transforming a conventional AC power source into a stepped-up DC voltage and a half-bridge type inverted, in response to a pair of switching driving signals, for switching the stepped-up DC voltage to make a high-intensity discharge lamp operate. The ballast also includes a digital controller for generating the pair of the switching driving signals, which have a predetermined dead time respectively between a switching-ON time interval of the switching driving signals and a phase difference of 180 degrees therebetween, in a way that frequencies of the pair of the switching driving signals are gradually shifted into some other stepped levels in turn within a predetermined bandwidth by a predetermined time interval and such a frequency shifting operation is cyclically repeated, to be supplied to the half-bridge type inverter. For the prevention of an audible noise of a high-frequency and stabilization of a flame, the high-intensity discharge lamp is driven in a reformed White Noise Modulation method where a driving signal is repeated with a first identical frequency several to several tens of times during a present period and the driving signal is varied into a second identical frequency and is also repeated several to several tens of times during the next period.

21 Claims, 9 Drawing Sheets

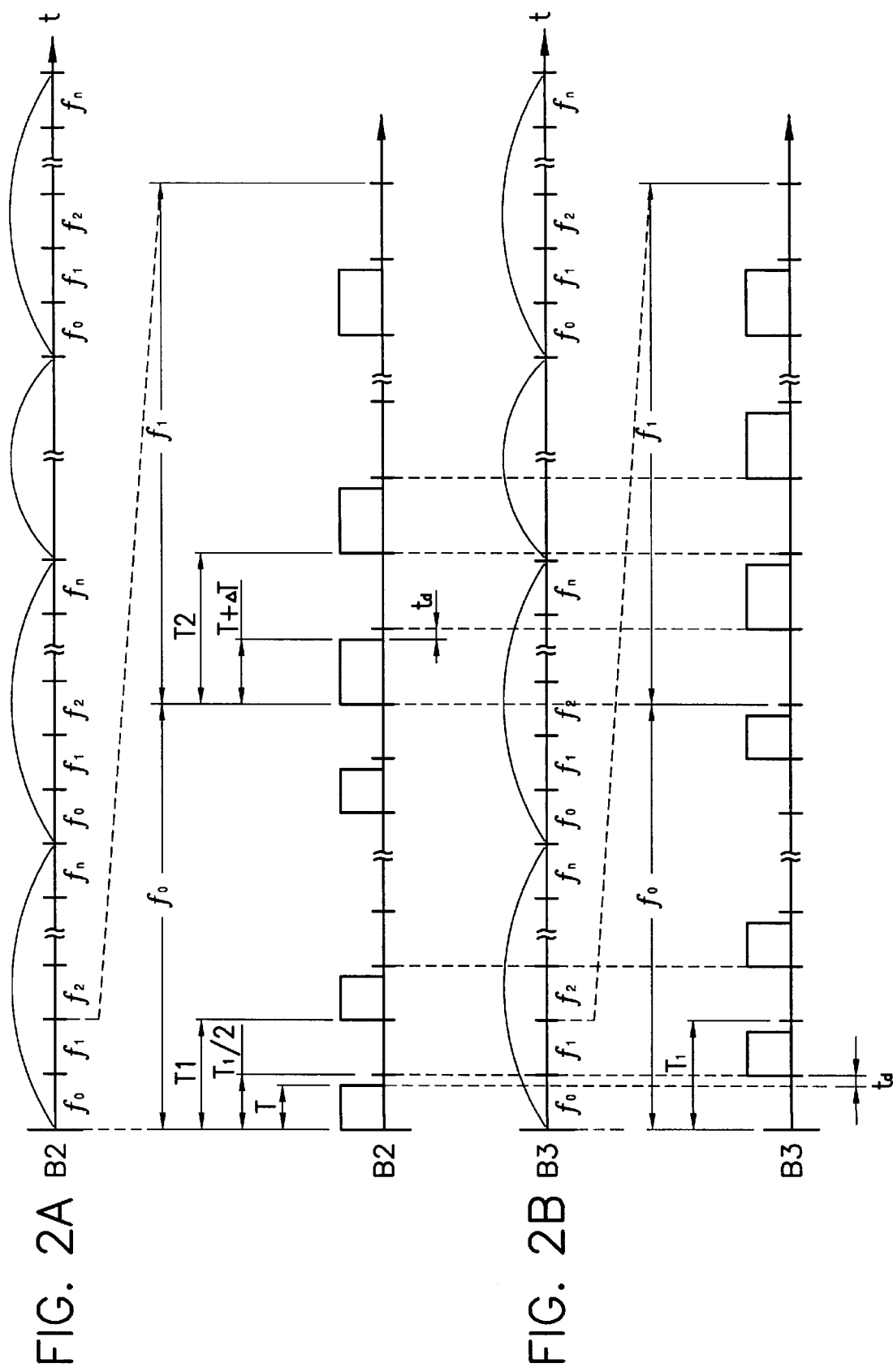

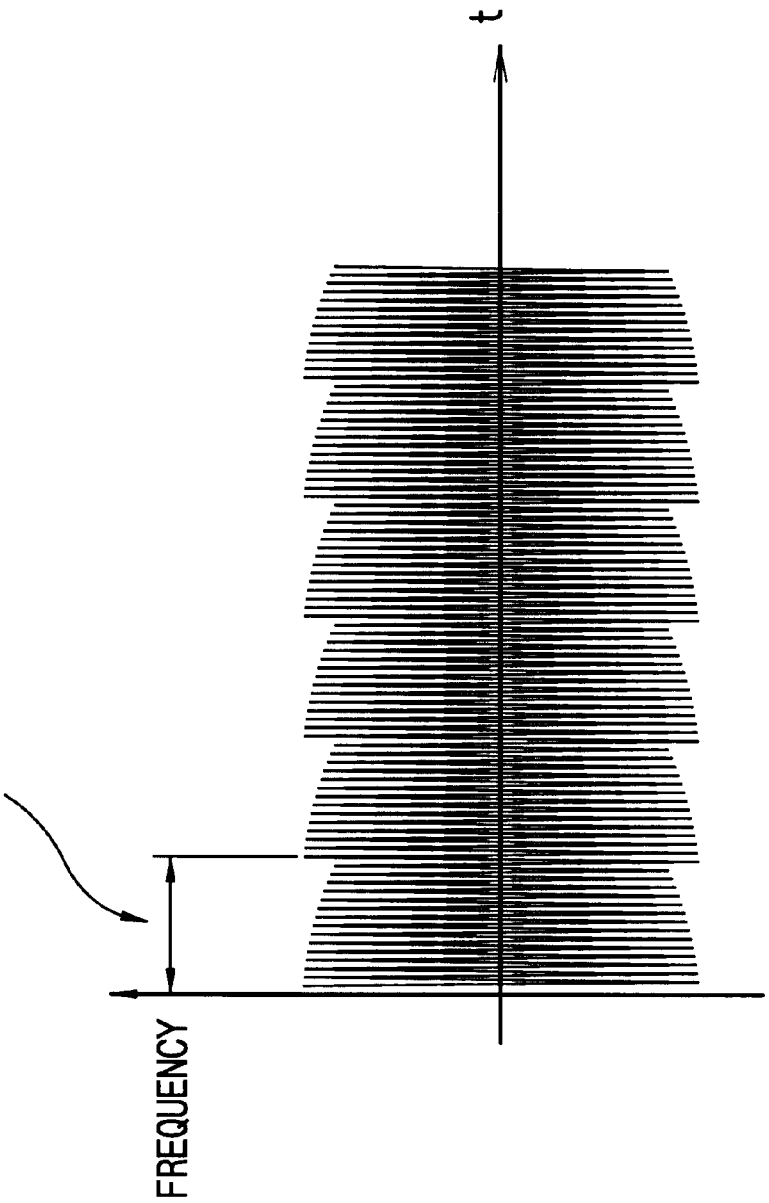

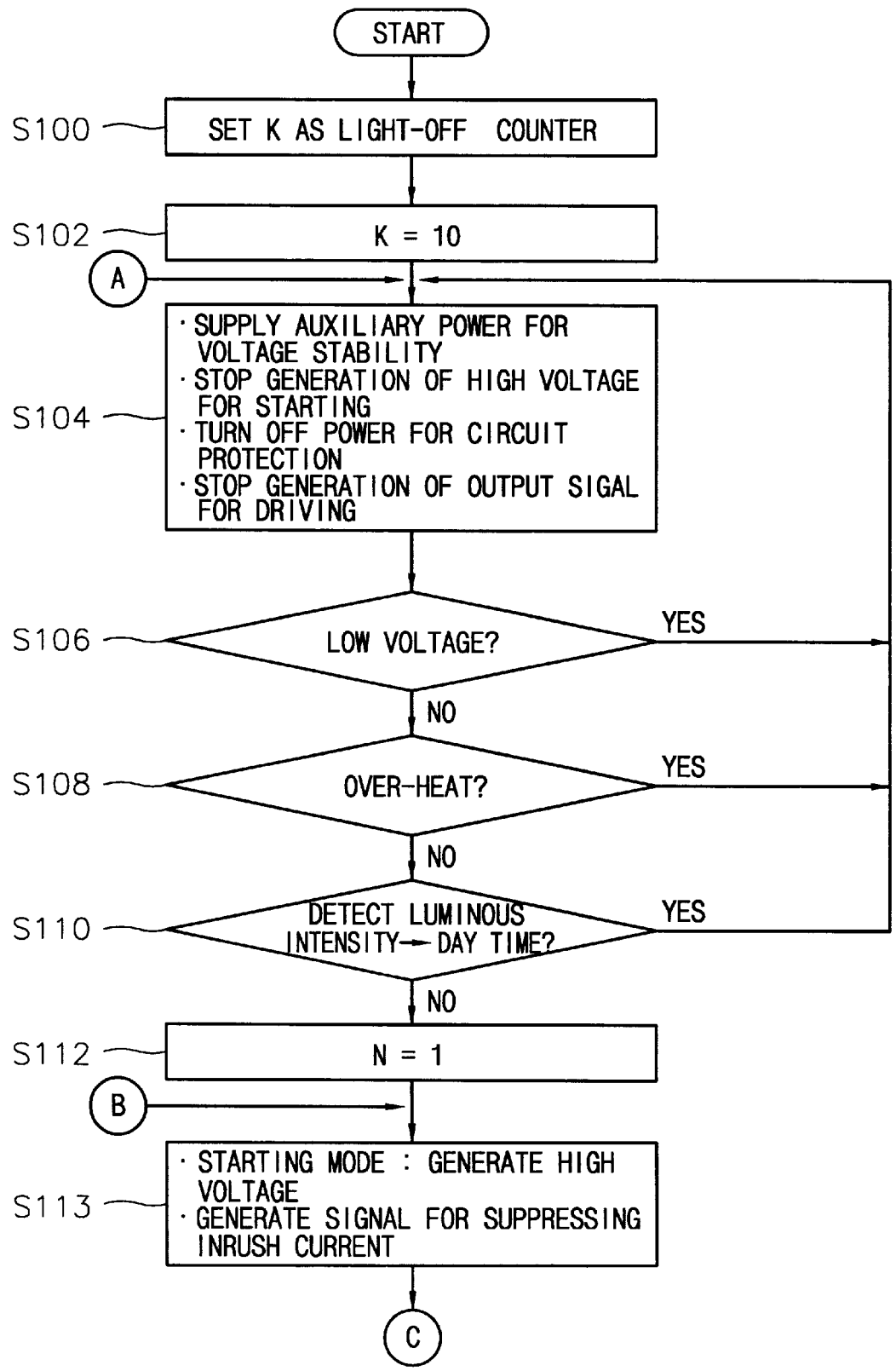

ELECTRONIC BALLAST FOR HIGH-INTENSITY DISCHARGE LAMP AND METHOD OF DRIVING HIGH-INTENSITY DISCHARGE LAMP

BACKGROUND OF THE INVENTION

1. Field of the Invention

The present invention relates to an electronic ballast for high-intensity discharge (hereinafter, referred to as "HID") lamp such as sodium vapor lamp, mercury lamp, metal halide lamp, and more particularly relates to the electronic ballast which employs a microprocessor to obtain a stable lighting control of the HID lamp by producing a driving signal in a transformed type of a White Noise Modulation method.

2. Description of the Prior Art

Up to now, the circuit configuration of the electronic ballasts for the HID lamp has been mostly an analog circuit or the circuit configurations based on a simple logic. These kinds of electronic ballasts have advantages compared with a digital control system in the case that the control is simple. But, in case of complicated circuit configurations and complicated control logic, the digital circuit system in which applied a microprocessor would rather be more advantageous in terms of a circuit configuration and a cost.

In U.S. Pat. No. 5,428,268, an electronic ballast for the HID lamp has been disclosed. In that patent, anyone can see that a ballast circuit has a very complicated configuration since the ballast circuit is made of an analog circuit and further a simple logic circuit.

As a method of driving the HID lamp, there have been three typical driving methods: a method using a frequency of several tens or hundreds of Khz for lighting the HID lamp, a method using a modulation of a carrier square wave of low frequency by a wave of a high frequency and a method using a frequency-shift. The modulation method has a disadvantage in dimming operation, and the frequency shift method has a defect in stabilizing an arc of the HID lamp because conventional HID lamps have different characteristics according to manufacturers. Especially, configuring the ballast of the metal halide lamp with an electronic type may cause an unstable flame fluctuation or acoustic-resonance, therefore an arc tube is broken at the worst.

A document entitled "White-Noise Modulation of High-Frequency High-Intensity Discharge Lamp Ballasts" was disclosed by Laszlo Laskai, Prasad N. Enjeti and Ira J. Pitel in IEEE Transactions Industry Application Vol. 14, No. 3, May/June 1998. In the document, in order to avoid acoustic-resonance-related instabilities in metal halide lamps operated with a high-frequency electronic ballast, a new method using angle-modulation was proposed to randomize a switching frequency of an inverter and to limit a lamp power spectrum below a threshold value. But, even this method still have a defect of audible noise in high-frequency, the higher the number of wattage is, the louder the audible noise is.

There is a method of using a half-bridge inverter circuit. This method also has a problem that when a ballast has a high power, a phenomenon of a wave shift happens during a switching operation of the half-bridge inverter. And, the wave shift causes an imbalance of heat generations between an upper switching section and a lower switching section, so that the life of ballast becomes short.

SUMMARY OF THE INVENTION

The main object of the present invention is to provide solutions for above-mentioned continuing problems of the electronic ballast for HID lamp.

The first object is to provide an electronic ballast for HID lamp and a driving method of the ballast, which has no audible noise of a high frequency, by gradually varying the switching frequency of the inverter into several frequency bands within a predetermined bandwidth and by forming the transformed type of a White-Noise Modulation pattern which maintains an identical frequency during several to several tens of periods in every stage of the several frequency bands.

It is a second object of the present invention to provide an electronic ballast for HID lamp and a driving method of the ballast, which is capable of obtaining a balanced heat generation between an upper switching section and a lower switching section of the half bridge inverter, by setting a dead time between a switch-ON interval of a pair of inverter's switching driving signals which have a phase difference of 180 degrees and by making the shifted waveform of the inverter circuit similar to a gate waveform for driving.

It is a third object of the present invention to provide an electronic ballast for HID lamp and a driving method of the ballast, which is capable of a dimming control by changing a frequency band of the switching frequency with a predetermined bandwidth.

In order to accomplish the objects, there is provided an apparatus, according to the present invention, comprising: a power source circuit means for transforming a conventional alternating current power source into a stepped-up direct current voltage; a half-bridge type inverting means, in response to a pair of switching driving signals, for switching the stepped-up direct current voltage so as to operate the high-intensity discharge lamp; and a digital controlling means for generating the pair of the switching driving signals, which have a predetermined dead time respectively within a switching-ON time interval of the switching driving signals and a phase difference of 180 degrees therebetween, in a way that frequencies of the pair of the switching driving signals are gradually shifted into some other stepped levels in turn within a predetermined bandwidth by a predetermined time interval and such a frequency shifting operation is cyclically repeated, the pair of the switching driving signals being supplied to the half-bridge inverter.

The method of the present invention is characterized by comprising the steps of: generating a switching driving signal of a predetermined frequency with k repetition times; changing the period of the switching driving signal with the predetermined frequency; performing the previous steps of generating and changing n times; and sequentially repeating the previous steps.

A preferable apparatus of the present invention comprises: a converter for converting an alternating current power source into a direct current voltage; a booster for producing a boosted direct current voltage by boosting the direct current voltage; an auxiliary power source, connected to the booster, for generating an operating voltage from the boosted direct current voltage during a starting operation of the high-intensity discharge lamp and for generating the second operating voltage which is stabilized during a normal operation; a half-bridge type inverting means, in response to a pair of switching driving signals, for switching the boosted direct current voltage to operate the high-intensity discharge lamp; a starting circuit, connected to the half-bridge type inverter, in response to a starting control signal, for making the high-intensity discharge lamp start with the boosted direct current voltage; and a digital controlling section, with receiving the operating voltage from the auxiliary power source, for generating the starting control signal after starting the high-intensity discharge lamp so as to disable the starting circuit, for generating, during a normal operation of the high-intensity discharge lamp, the pair of the switching driving signals, which have predetermined dead times within a switching-ON time interval of them and have a phase difference of 180 degrees between them, in a way that their frequencies are gradually varied into some other stepped levels in turn within a predetermined bandwidth by a predetermined time interval and such a frequency shifting operation is cyclically repeated, to be supplied to the half-bridge type inverter.

BRIEF DESCRIPTION OF THE DRAWINGS

The above objects and other advantages of the present invention will become more apparent by describing in detail preferred embodiments thereof with reference to the attached drawings, in which:

FIGS. 2A and 2B show waveforms of the switching driving signals related to a preferred embodiment of the present invention;

FIG. 3 shows a frequency packet of a white-noise modulated wave;

FIGS. 4A to 4C are flowcharts for explaining operations of the electronic ballast for the HID lamp using the microprocessor according to the present invention.

DESCRIPTION OF THE PREFERRED EMBODIMENT

Hereinafter, a preferred embodiment of the present invention will be explained in more detail with reference to the accompanying drawings.

Figure 1A:
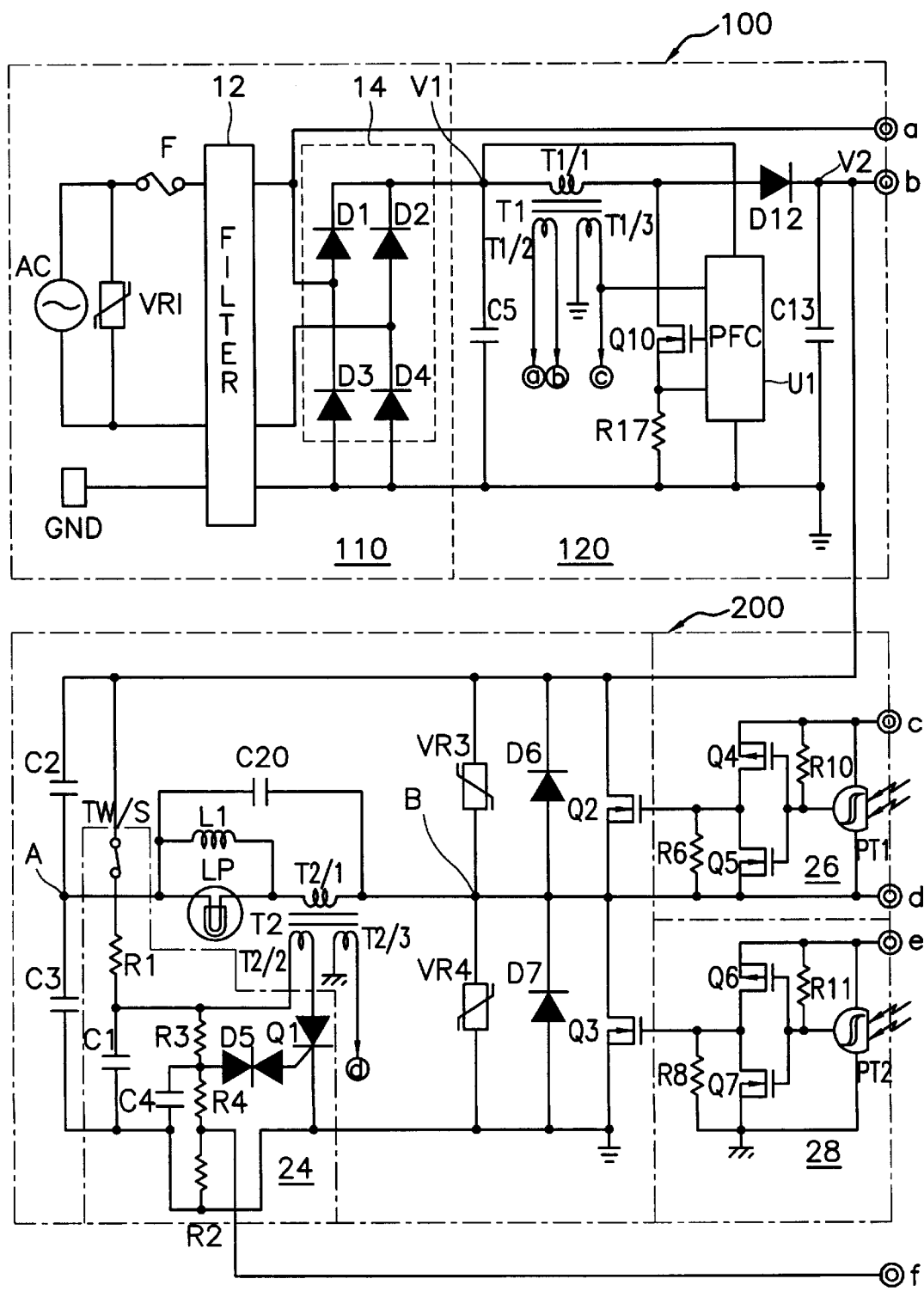
FIGS. 1A to 1C are circuit diagrams of the electronic ballast for the HID lamp using a microprocessor according to the present invention.
Figure 1B:
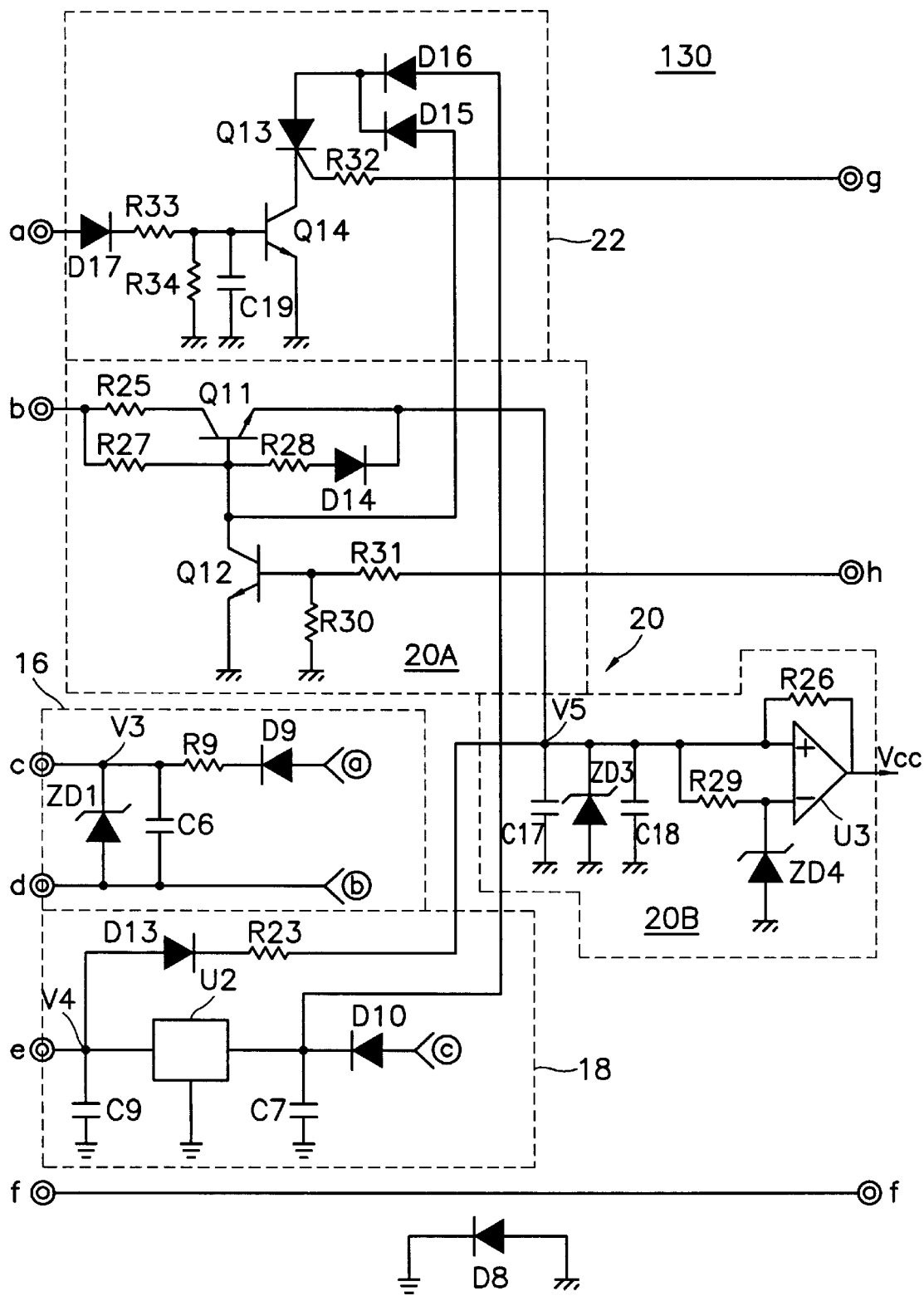
Figure 1C:
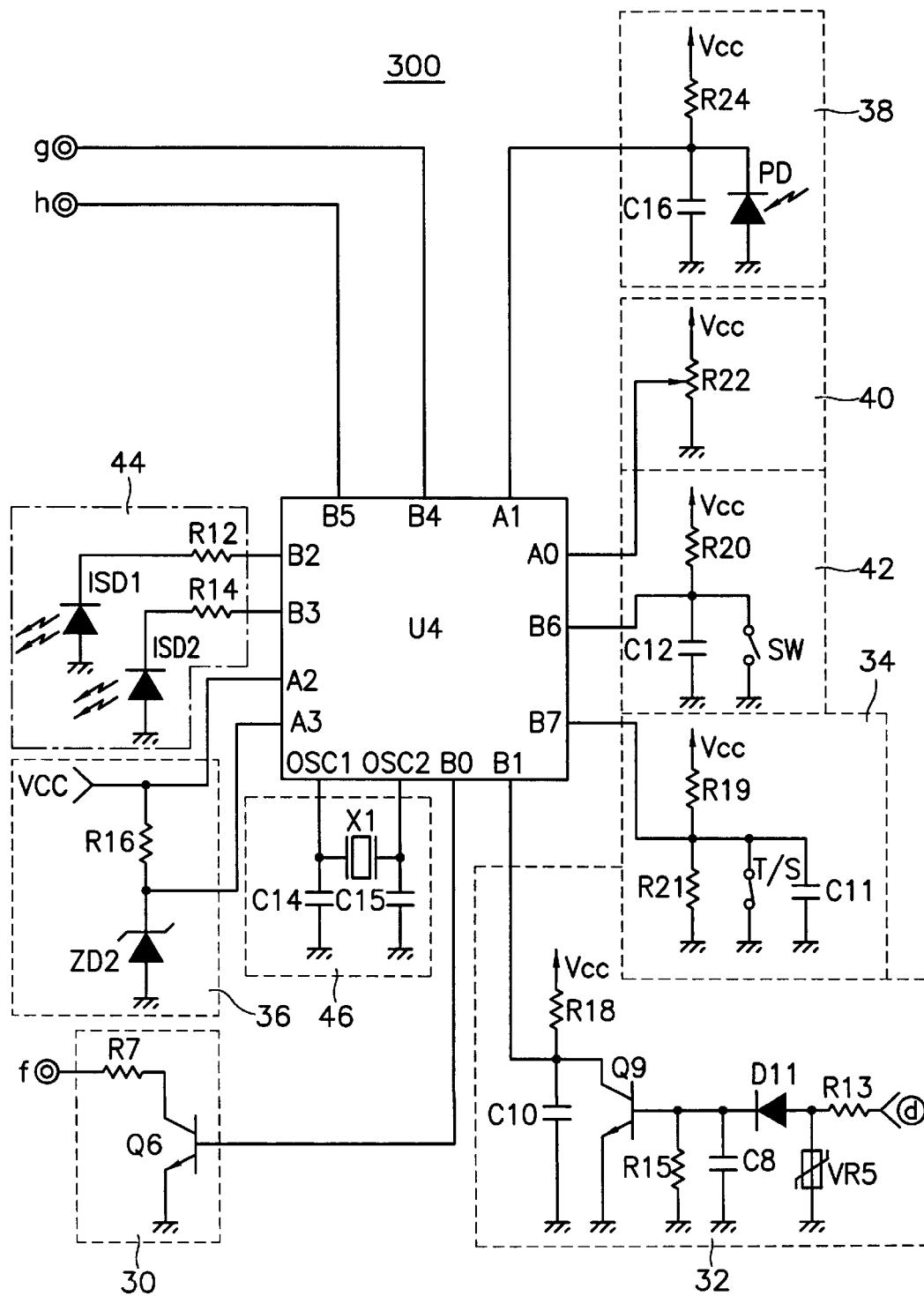

Each of FIGS. 1A to 1C is a divided circuit of an electronic ballast for the HID lamp using a microprocessor, according to the present invention. The electronic ballast shown in FIGS. 1A to 1C consists of a power source circuit 100, a half-bridge type inverter 200 and a digital controller 300. Power source circuit 100 includes an AC-to-DC converter 110, a booster 120 and an auxiliary power source 130.

Referring to FIG. 1A, AC-to-DC converter 110 provides a power source (AC) in ordinary use to a rectifier 14 through a filter 12 for suppressing an electromagnetic interference (EMI). Rectifier 14, configured with bridge diodes D1 D4, transforms the AC power source in ordinary use into a first DC voltage V1.

Booster 120 consists of a control circuit U1 for an improvement in a power factor, an input smoothing capacitor C5, a transformer T1, a switching transistor Q10, a resistor R17, a diode D12 and an output smoothing capacitor C13. Booster 120 performs a high frequency switching of first DC voltage V1 by switching transistor Q10 and first DC voltage V1 is stepped up by transformer T1, so that booster 120 provides a second DC voltage V2 as a main operating voltage. Transformer T1 includes a first winding T1/1, a second winding T1/2 and a third winding T1/3.

With reference to FIG. 1B, auxiliary power source 130 includes a first power source 16, a second power source 18, an operational power source 20 and a power interrupter 22. First power source 16, consisting of a diode D9, a resistor R9, a capacitor C6 and a zener diode ZD1, is inductively coupled with booster 120 through second winding T1/2 of transformer T1. First power source 16 performs a half-wave rectification to a high frequency signal induced by second winding T1/2, limiting the half-wave rectified signal with zener diode ZD1 to output a third DC voltage V3 as a first power source voltage. The first power source voltage is used as a power source to drive one switching transistor of half-bridge type inverter 200.

Second power source 18 consists of a diode D10, a capacitor C7, a three-terminals-regulator U2, a capacitor C9, a diode D13 and a resistor R23 and is inductively coupled with booster 120 through third winding T1/3 of transformer T1. Thus, second power source 18 rectifies in a way of half-wave rectification a high frequency signal induced by third winding T1/3, reforms the half-wave rectified signal by three-terminals-regulator U2 and outputs a fourth DC voltage V4 as a second power source voltage. The second power source voltage is used as a power source to drive the other switching transistor of half-bridge type inverter 200 and is provided as a driving power source of digital controller 300 during a normal operation mode.

Operational power source 20, broadly, consists of a starting power source 20A and a brown-out circuit 20B. Starting power source 20A includes resistors R25, R27, R28, R30 and R31, transistors Q11 and Q12, and a diode D14 for preventing an inverse current. Starting power source 20A lowers main operating voltage V2 of booster 120 with resistor R25 and provides a level-downed voltage to digital controller 300 as an operating voltage in a starting operation through transistor Q11. Starting power source is switched on/off by the switching operation of transistor Q11, a switching operation of transistor Q11 is controlled by transistor Q12 which is switched in response to a starting control signal supplied from digital controller 300 through a terminal h. Thus, a starting voltage is used only for the starting of the HID lamp because an induced voltage across third winding T1/3 of transformer T1 of booster 120 becomes unstable and thus may cause errors of digital controller 300 due to the fact that only the starting circuit of half-bridge type inverter 200 is operated for the starting operation.

In the starting stage of the HID lamp, the starting control signal has a ground voltage so that transistor Q12 is OFF and transistor Q11 becomes conductive by means of divided voltages by resistors R27 and R28. As a result, main operating voltage V2 can be stably provided through resistor R25. After the HID lamp has been lighted, a level of the starting control signal rises up to the operating voltage level to turn transistor Q12 ON and to turn transistor Q11 OFF, thus the normal operating voltage is provided only with second power source voltage V4.

Brown-out circuit 20B consists of a capacitor C17, a zener diode ZD3, a capacitor C18, resistors R29 and R26, a zener diode ZD4, and an operational amplifier U3. Brown-out circuit 20B receives the operating voltage from starting power source 20A in the starting operation stage, receives the second power source voltage from second power source 18 and provides the operating voltage of digital controller 300 in the normal operation stage. Besides, in the starting operation stage or a instant restarting protection mode, a fifth DC voltage V5 is formed. Operating voltage Vcc is forced to be outputted through an output terminal only when a voltage applied to a noninverting terminal (+) of operational amplifier U3 is limited by zener diode ZD4 and is higher than a voltage applied to an inverting terminal (−). As a result, the operating voltage is not allowed to be supplied to digital controller 300 when fifth DC voltage V5 is lower than a reference voltage by zener diode ZD4 and thus a wrong operation of digital controller 300 can be prevented.

Power interrupter 22 consists of resistors R32, R33 and R34, diodes D15, D16 and D17, a thyristor Q13, a transistor Q14 and a capacitor C19. In a ballast, various protection modes turn operative by such situations as over-heat, no-load, starting failure, and/or deterioration of a lamp. In this situation, digital controller 300 provides a power interruption control signal having the operating voltage level through a terminal g for thyristor Q13 to be turned on. And, transistor Q11 is turned off by lowering a base voltage of transistor Q11 to the ground voltage through diode D15 and transistor Q14, which has been maintained in an ON state by resistors R33 and R34. Thus, power supply by starting power source 20A is interrupted. At the same time, fourth DC voltage V4 is forced to be reduced to the ground voltage level through diode D16 so that the operation of a power-factor improving control circuit U1 is interrupted and the whole operation of the ballast is also interrupted. From the interruption of the ballast's operation, the ballast can be protected.

For the normal operation of the ballast, the AC power source should be applied again after interruption of the AC power source. Namely, the interruption of the AC power source causes transistor Q14 to be turned off and then thyristor Q13 is also turned off, which results in a reset state. After this, the normal operation will be initiated under the same condition that the power source is newly applied.

There is provided a diode D8 between grounds of booster 120 and half-bridge type inverter 200, which operate with a high voltage, and a ground of digital controller 300, which operate with a low voltage, in order to prevent a noise of the high voltage from the high voltage circuit from flowing into digital controller 300. A voltage as high as several thousands of volts is supplied to the HID lamp for starting and this high voltage is developed as a superimposed noise with the ground voltage. Diode D8 protects the digital controller against the noise and wrong operations.

Referring to FIG. 1A, half-bridge type inverter 200 includes two coupling capacitors C2 and C3 having serial connections and two switching transistors Q2 and Q3 between two terminals, that is, the ground and a terminal b of booster 120. Between a common connection A of coupling capacitors C2 and C3 and a common connection B of switching transistors Q2 and Q3, a HID lamp LP and a transformer T2 are serially connected with each other. Furthermore, a capacitor C20 is connected between common connections A and B, and an inductor L1 is connected in parallel to the HID lamp LP. In order to obtain the balanced heat generation between upper and lower switching sections, capacitor C20 of half-bridge type inverter 200 restores a phase of a lag waveform which is shifted due to a load application to an original wave form which is applied to gates of switching devices Q2 and Q3. A varistor VR3 and a diode D6 are connected in parallel between the source and drain terminals of switching transistor Q2, and a varistor VR4 and a diode D7 are connected in parallel between the source and drain terminals of switching transistor Q3. Transformer T2 includes a ferrite core, a second winding T2/2 and a third winding T2/3 provided at secondary side thereof.

A starting circuit 24 consists of resistors R1, R2, R3 and R4, capacitors C1 and C4, a switching device, a thyristor Q1, a diac D5 and a thermistor (a thermal switch) TW/S. In the configuration of starting circuit 24, thermistor TW/S, resistor R1 and capacitor C1 are serially connected across second voltage V2 and a ground, and second winding T2/2 of the secondary side of transformer T2 is connected to a common connection between resistor R1 and capacitor C1 and to an anode of thyristor Q1 by two terminals thereof. Resistors R3, R4 and R2 are serially connected across capacitor C1. Diac D5 is connected between the connection of two resistors R3 and R4 and a gate of thyristor Q1. Capacitor C4 is connected in parallel across serially connected resistors R2 and R4. A starting control signal from digital controller 300 is applied to the common connection of resistors R2 and R4.

In starting circuit 24, a voltage across capacitor C1 charged through resistor R1 is divided by resistors R2, R3 and R4, and when the divided voltage is larger than a limit voltage of diac D5, thyristor Q1 turns conductive so that the charge of capacitor C1 flows into thyristor Q1 abruptly through second winding T2/2 of the secondary side of transformer T2. Just after completion of the discharge, switching device Q1 is turned off and at this time a counter electromotive force is induced across second winding T2/2 of the secondary side of transformer T2 to generate a pulse. The induced pulse induces a high voltage as high as several thousands of volts, proportional to a ratio of winding numbers, across the first winding of the primary side of transformer T2 and the induced high voltage is then applied to HID lamp LP so as to begin the discharge. Here, a malfunction that thyristor Q1 is not turned off even after discharge of the HID lamp sometimes occurs. This malfunction causes resistor R1 to be over-heated and thus destroys the ballast. In order to obviate this malfunction, thermistor TW/S protects the ballast by disconnecting a path prior resistor R1 when a temperature of resistor R1 exceeds a limit value because thyristor Q1 is not turned off.

A first driving section 26 is connected between a gate and a source of switching transistor Q2 by its output port. And, a second driving section 28 is connected between a gate and a source of switching transistor Q3 by its output port. First driving section 26 consists of switching transistors Q4 and Q5, resistors R6 and R10, and a light receiving element PT1. First driving section 26 is connected to first power source 16 by terminals c and d so that first operation section 26 is supplied with first power source voltage V3 as an operating voltage. Thus, first driving section 26 is optically coupled with digital controller 300 so as to receive a switching driving signal but is isolated in view of electricity.

Second driving section 28 consists of switching transistors Q6 and Q7, resistors R8 and R11, and a light receiving element PT2. Second driving section 28 is connected to second power source 18 through a terminal e and the ground of the operational power source and uses second power source voltage V4 as an operating voltage. Thus, second driving section 28 is optically coupled with digital controller 300 so as to receive a switching driving signal but is isolated in view of electricity.

Referring to FIG. 1C, digital controller 300 includes a microprocessor U4, a starting interrupter 30, a light-ON/OFF detector 32, a temperature detector 34, a voltage level detector 36, a luminous intensity detector 38, a dimming controller 40, a dimming mode selector 42, a switching driving signal output 44 and a clock generator 46.

Microprocessor U4 is one chip comprising a central processing unit, an analog-to-digital (A/D) converter input terminal, a random access memory, and a read only memory. The usefulness of respective input/output terminals of microprocessor U4 is as follows.

A0 (A/D converter input): an input terminal, connected to dimming controller 40, for the receipt of a dimming value.

A1 (A/D converter input): an input terminal, connected to luminous intensity detector 38, for the detection of variation of a voltage applied to luminous intensity detector 38 according to the variation of luminous intensity between the day time and the night time.

A2 (A/D converter input): an input terminal, receiving operation voltage Vcc, for detecting a voltage caused by charges residing, upon lighting or putting out the HID lamp, in an output capacitor C13 of booster 120 connected to dimming controller 40.

A3 (A/D converter input): an input terminal, connected to voltage level detector 36, as an input for the comparison with the terminal A2, for the reception of a reference voltage set by zener diode ZD2.

B0 (I/O output): an output terminal, connected to starting interrupter 30, for an output of a starting interruption control signal.

B1 (I/O input): an input terminal, connected to light-ON/OFF detector 32, for a reception of a light-ON/OFF signal of the discharge lamp.

B2 and B3 (I/O output): output terminals, connected to switching driving signal output 44, for the provision of switching signals to operate first and second driving sections. The switching operational signals are signals of transformed White-Noise Modulation ranged from several tens of Khz to several hundreds of Khz in frequency. Signals of B2 and B3 are generated alternately and there is a dead time within a signal-existent interval of the two signals. These signals can prevent the flame fluctuation generated in a high frequency band and can increase an efficiency of the ballast.

B4 (I/O output): an output terminal, connected to terminal g, for outputting a power interruption control signal capable of stopping the operations of a power factor improvement control circuit and the starting power source when various protection modes, such as a no-load protection, a starting failure protection, a low voltage protection, an over-heat protection, a instant restarting protection and a protection against repetitive ON/OFF of the lamp due to a bad quality of the lamp, are detected.

B5 (I/O output): an output terminal, connected to a terminal h, for an output of the starting control signal to interrupt the operation of the starting power source after the starting of the lamp.

B6 (I/O input): an input terminal, connected to dimming mode selector 42, for the selection between an automatic control and a manual control of the dimming.

B7 (I/O output): an output terminal, connected to temperature detector 34, for the reception of a detection signal of the over-heat detector in order to protect the ballast against being over-heated.

OSC1 and OSC2: terminals, connected to clock generator 46, for the reception of the operational clock.

Starting interrupter 30 consists of a resistor R7 and a transistor Q8. Transistor Q8 is connected to starting circuit 24 by its collector through a terminal f and resistor R7. An emitter of transistor Q8 is grounded and a base of transistor Q8 is connected to B0 terminal of microprocessor U4. When the HID lamp is lighted or when generating of a high voltage should be interrupted in response to the various protection circuits, a gate signal level of switching device Q1 of starting circuit 24 is pulled down to a ground level so that the high voltage cannot be generated.

Light-ON/OFF detector 32 consists of resistors R13, R15 and R18, a rectifying diode D11, a varistor VR5, capacitors C8 and C10 and a switching transistor Q9, and is connected to a terminal d of third winding T2/3 of secondary side of high frequency transformer T2 and to terminal B1 of microprocessor U4. Microprocessor U4 recognizes a state that a light-ON/OFF detecting signal is an operational power source level as a put-out (OFF) state and a state that the light-ON/OFF detecting signal is a ground voltage as a light-ON state. When the HID lamp is turned on, a voltage is induced across third winding T2/3 of secondary side of transformer T2 so that the signal voltage is dropped in its level by resistor R13, and a noise voltage generated during the starting is absorbed by varistor VR5, rectified by diode D11, filtered by capacitor C8, in turn. As a result, switching transistor Q9 is turned on so that a level of terminal B1 of microprocessor U4 is detected as a ground voltage, from which information about light-ON/OFF of the discharge lamp can be recognized.

Temperature detector 34 divides operating voltage Vcc by resistors R19 and R21, and a temperature detecting switch T/S1 is connected across resistor R21. Thus, when a detected temperature is below a preset over-heat temperature, the detected voltage has a ground level because switch T/S1 is kept ON. But, when a temperature of a control device rises beyond the over-heat temperature, the detected voltage rises to a supplying voltage level because switch T/S1 is turned off.

Voltage level detector 36 includes a resistor R16 and a zener diode ZD2, limits operating voltage Vcc by zener diode ZD2 and provides a reference voltage with a predetermined level to microprocessor U4.

Luminous intensity detector 38 consists of a resistor R24, a photo-diode PD and a capacitor C16. If there is a variation in the luminous intensity, a voltage level of terminal A1 of microprocessor U4 changes. Luminous intensity detector 38 not only turns on or off the discharge lamp in accordance with the voltage level of terminal A1 but also, like the control way of the dimming controller, being adaptive to the variation of the luminous intensity of an ambient, has frequency bands of first and second driving sections 26 and 28 varied, based on a program loaded in microprocessor U4, so that the dimming can be automatically controlled according to the luminous intensity of the ambient.

Dimming controller 40 is made of a variable resistor R22. Changing the voltage level of the terminal A0 of microprocessor U4 by varying the resistor value of resistor R22 causes a signal transformation of an input voltage of the A/D converter into a digital signal. According to the voltage level of this signal, the microprocessor controls a frequency band of a packet of frequency obtained from the transformed type of a White-Noise Modulation to be shifted by means of a built-in program so that the dimming is optimally controlled.

During a normal operation of providing a normal output in a predetermined frequency band, the dimming control can be accomplished by shifting the current frequency band of the transformed type of a White-Noise Modulation signal as a whole into a higher frequency band or a lower frequency band. For example, the dimming control is achieved by dividing a frequency band of 40–50 Khz into several or several tens of frequencies so as to output the frequency of a white-noise modulated signal and by shifting the frequency into the frequency band of 45–50 Hhz.

Dimming mode selector 42 consists of a resistor R20, a capacitor C12, and a switch SW. The dimming mode selector selects one between a manual way of dimming control by a dimming controller 52 and an automatic way of dimming control by a luminous intensity detector 54.

Switching driving signal output section 44 includes resistors R12 and R14, and light emission diodes ISD1 and ISD2, and transforms the switching driving signal supplied from terminals B2 and B3 of microprocessor U4 into an optical signal and provides the transformed optical signal to first and second driving sections 26 and 28.

Clock generator 46, consisting a crystal oscillator X1 and capacitors C14 and C15, generates a reference clock signal required by microprocessor U4.

FIGS. 2A and 2B represent the switching driving signal outputted from terminals B2 and B3 of microprocessor U4. The switching driving signal is an output signal obtained by the transformed type of a White-Noise Modulation, where the output signal has at first a first frequency of about several tens of Khz, and then has a second frequency whose period interval increases or decreases within several microseconds. The next frequency of the output signal also has an increment or decrement in its period interval within several microseconds. Here, frequency variation times as above are recommendable to be ranged from several times to about 100 times. Once the increment in frequency is chosen, it should be kept all the way through. Similarly, once the decrement in frequency is initiated, the frequency can not have increment in its variation.

Namely, in an example shown in FIG. 2, if a period is extended in way of T1<T2<T3<T4 . . . , the value of the frequency decreases from a maximum frequency to a minimum frequency, where this operation is cyclically repeated so that the switching driving signal modulates in a way of the transformed type of a White-Noise Modulation. Namely, according to the present invention, during the frequency shift from one value to another value within a frequency band limited by the minimum frequency and the maximum frequency, a high level of audible noises can be removed by the frequency shifting method that an output signal with an identical frequency, that is, an identical period, is repeated several times to several tens of times and then the output signal which has another identical frequency is repeated the same times.

Furthermore, switching driving signals B2 and B3, having a phase difference of 180 degrees with each other within a period, are generated alternately, and there is the dead time less than several microseconds when a signal exchange between two alternating signals occurs.

FIG. 3 represents a wave form of a high frequency driving signal applied to a discharge lamp by the switching driving signal of FIG. 2 through the half-bridge type inverter. As shown in FIG. 3, in a packet of frequency, that is, in a predetermined frequency band, the high frequency driving signal with a variation in a frequency applied to the discharge lamp has a periodic characteristic.

Figure 4B:
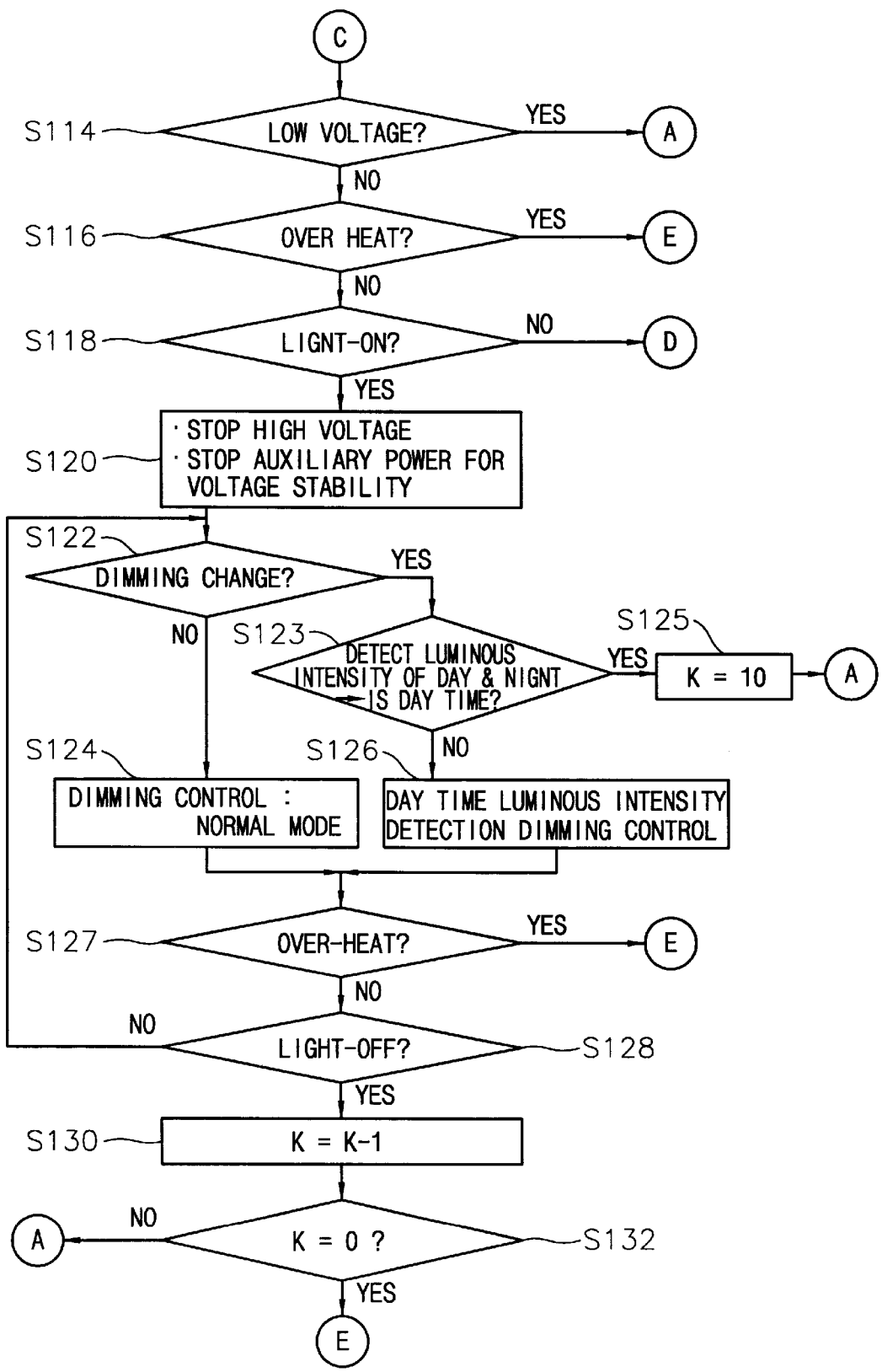
Figure 4C:
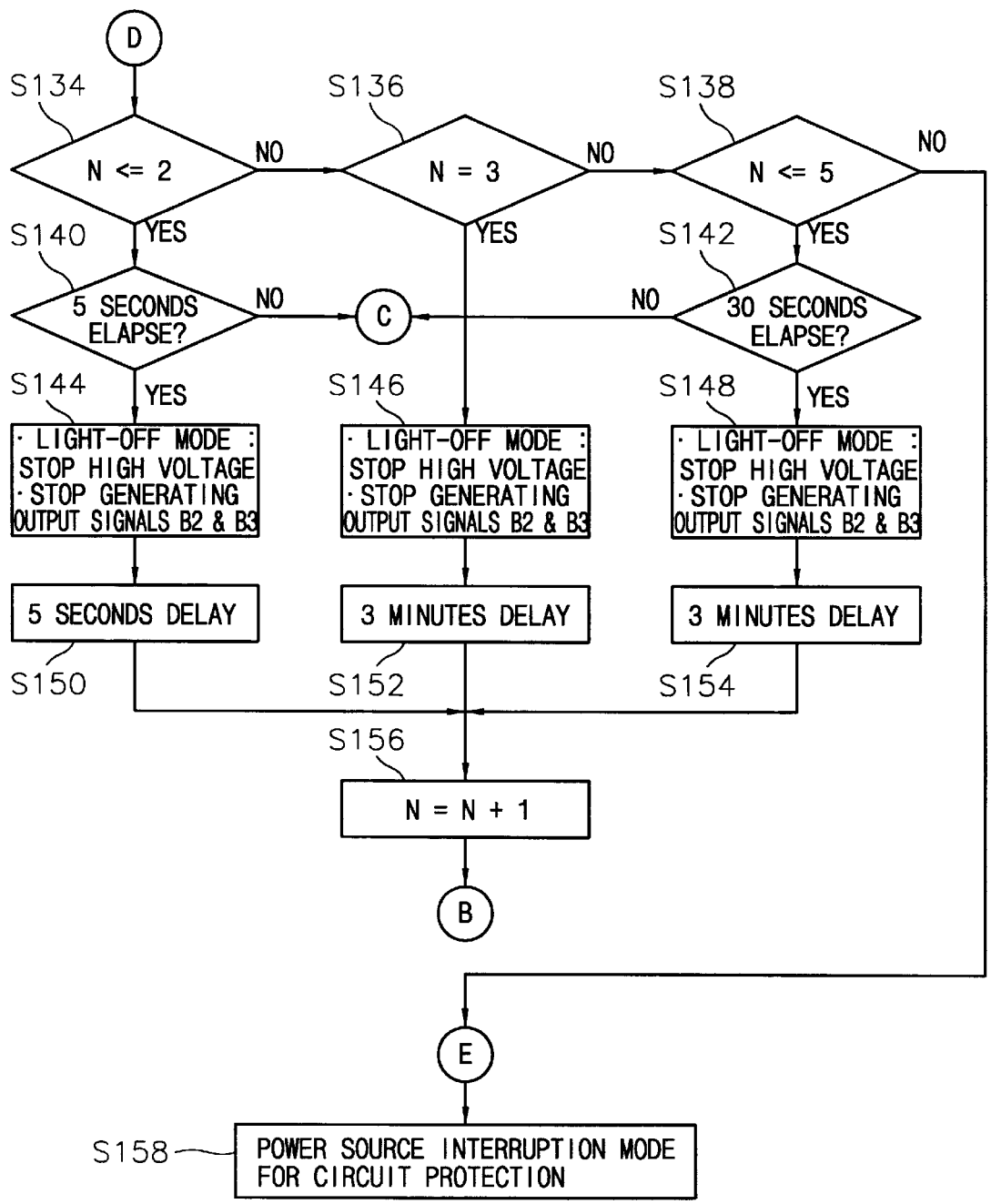

FIGS. 4A to 4C are flow charts explanatory of operation of the electronic ballast using the microprocessor according to the present invention. With receiving the AC power source as the operational power source, microprocessor U4 begins its operation after initialization and setting of some values.

In beginning steps of S100 and S102, a counting variable K is designated for representing a counted value of light-off times of a lamp, and a numeric value, for example 10, is assigned to counting variable K. The steps are provided to check the light-off times of the lamp while microprocessor U4 is on operation. When the whole counted light-off times reach the preset value of 10, the setting operation of steps S100 and S102 is implemented so that power source interrupter 22 can begin its operation in step S158.

There is provided a step S104 for the initialization of the ballast. In step S104, a stable power source is applied to microprocessor U4 by letting the level of terminal B5 of microprocessor U4 be dropped to a low level for the operativeness of starting power source 20A, the level of terminal B0 being turned into a high level in order to interrupt the generation of a high voltage for the starting, the level of terminal B4 being turned into a low level in order to prevent power source interrupter 22 from being operated, and the switching driving signals of terminals of B2 and B3 being interrupted from being generated.

In step S106, when the supplied voltage is so unstable that the level of the supplied voltage is below a predetermined voltage, that is, when the supplied voltage is a low voltage, a voltage by zener diode ZD2 is supplied as the reference voltage through terminal A3 and operating voltage Vcc of microprocessor U4 is supplied as an analog input through terminal A2. The two voltage signals are converted by the A/D converter and then compared with each other. From the proceeding comparison by the built-in program, if the voltage supplied for the operation of the microprocessor is below a predetermined level (in case of a low voltage), next step becomes step S104 and then the loop of steps S104 and S106 are continued until the supplied voltage reaches the predetermined level. But, if the supplied voltage is not the low voltage, the next step to be implemented is step S108.

In step S108, whether an over-heat state arises is checked with terminal B7. When the over-heat state is checked the loop of steps S104, S106 and S108 becomes operative until the electronic ballast is cooled off. When the over-heat state is not checked, step S110 is the step to be implemented.

Step S110 is a luminous intensity detecting step for determining whether to turn on or to turn off the electronic ballast by analyzing the ambient luminous intensity. The electronic ballast is turned on or off by a determination whether a present time is a day time or a night time from a signal analysis on an analog signal whose voltage level varies according to a quantity of light applied to input terminal A1.

In step S112, an integer N is assigned with a numerical value 1, where integer N is provided to count how many times a starting mode of the ballast operates.

Step S113 is a starting mode step for the starting of the HID lamp. In step S 113, terminal B0 turns to a low level of voltage so that the starting circuit can operate and a signal, which is provided for the suppression of an inrush current or for a stable starting and is capable of driving the inverter circuit, can be generated through terminals B2 and B3.

Next, step S114 is a step for the protection of the microprocessor when the voltage of the power source applied to the microprocessor is so unstable that the voltage is below the reference voltage. Step S116 is served as a mode for the over-heat protection, and step S118 is served as a mode for the determination whether the HID lamp is now lighted-on or lighted-off. These steps serve for the starting of the HID lamp. As for the protection mode at the starting step, there are protections such as a no-load protection, a starting failure protection, a instant restarting protection, a low voltage protection and an over-heat protection.

The protection modes are as follows.

1. Low Voltage Protection

In an identical operation principle to step S106, step S114 performs the low voltage protection, comparing a voltage of terminal A2 with a reference voltage of terminal A3 by the zener diode so that if a level of a voltage supplied from the microprocessor is below a predetermined level, a running step is returned to step S104 to interrupt whole outputs, and if the level of the voltage is normal, the running step proceeds to the next step.

2. Over-Heat Protection

The over-heat protection occurs through two steps: one is starting and the other is normal lighting. The over-heat protection during the starting step checks an over-heat state by terminal B7. During the starting, if the over-heat state is checked, the running step circulates through a loop of steps S104, S106, S108 until ballast is cooled; otherwise, the running step proceeds to the next step. During the normal lighting, the over-heat is checked for protection in step S127. If the over-heat state is detected at terminal B7, the interruption to whole operations of the ballast is made by driving the power source interrupter; otherwise, the running step is passed to the next step.

3. No-Load Protection and Starting Failure Protection

No-load and starting failure protections are achieved in steps S134–S158.

In steps S134, S140, S144 and S150, the starting mode alternately repeats ON and OFF by a time interval of 5 seconds. Here, if the lamp is not lighted on, the starting mode is repeated two times. At every implementation of this process the value of integer N is added by one and the running step returns to step S113. Thus if the starting mode still not be implemented at two times, that is, the number of integer N is 3, then, the running step is passed to step S113. Then passing through steps S134 and S136, all outputting operations stop in step S146, and the HID lamp becomes cool during a time delaying time, for example, three minutes.

After the three minutes elapse, the value of integer N is added by 1 to make 4, the starting mode of step S113 being operated and then returning to step S138 after passing through steps S134 and S136. Next, after proceeding to step S142 from step S138, the starting mode operates during 30 seconds. If the lamp is not lighted on while the starting mode is on-operation, the light-off mode to wait for three minutes is repeated in step S148. For a reliability of lamp starting, the above step is repeated twice. Since a state that the lamp is not lighted on in spite of the above process means that there is no lamp or is a bad-lamp, steps S113, S134, S136 and S138 are implemented and then terminal B4, which determines the implementation of the power source interruption mode of step S158, is made into a high state to stop whole operations. Through the above procedures, the no-load protection and the ballast protection in the starting failure mode can be achieved.

4. Instant restarting protection

The instant restarting protection is achieved by the loops of the no-load protection or the starting failure protection. But, there is a different aspect, when the lamp is lighted off due to a instant no supply of the power source amid a light-on state of the lamp and then the lamp is lighted on again, to use the charge accumulated in capacitor C13 of the booster. Since the capacitor has a large capacitance, a discharging time is about several seconds.

Accordingly, the power source is supplied to the digital controller as its operational power source through auxiliary power source 130 for the voltage stability and the microprocessor continues its operation even though there is no supply of a conventional AC power source. Next, when the conventional AC power source is supplied again through steps of S134, S140, S144 and S150 like the no-load protection mode, the operation of start-and-stop of the starting operation is done twice by a time interval of five seconds. Here, since the HID lamp is heated, the HID lamp does not light on itself. Thus, after the above procedure, the value of integer N become 3 and the running step passes through steps S113, S134, S136 and S146 in turn so that the whole outputting operations are stopped. And then, the HID lamp loses its heat during the delaying time of three minutes in step S152, and after the three minutes, the value of integer N becomes 4 due to an increment by one and the starting mode is operated again during thirty minutes in step S138 after passing through steps S113, S134 and S136.

If the lamp is not turned on in spite of the above procedure, in step S148, the light-off mode is activated again and has to await three minutes without the generation of the starting signal. For the certainty of the starting of the lamp, the above procedure is repeated twice. If the lamp is not lighted on after all, the voltage level of terminal B4 is raised high in step S158 so that the whole operations stop. As described above, the instant restarting protection is achieved in the way of lighting-on the lamp again after lighting-off the lamp during several minutes.

5. Protection from repeat of lamp on/off due to Bad Lamp

This protection is achieved by steps S100, S102, S128, S130 and S132. Under a condition that variable K is designated as a counting variable representing times of lamp-off in step S100, and a numerical value 10, for example, is assigned to variable K in step S102, if the lamp is put out without interruption of an external power source, this is checked in step S128 and the value of variable K decrease by one in step S130. Until the value of variable K reaches 0, trials to light on the lamp are repeated. When the value of variable K is equal to 0, in other words, when on/off times of the lamp reach 10 times, the power source interrupter is enabled to refrain the ballast from operating. Namely, the flickering protection is achieved by making the ballast disable when the on/off times of the lamp reach predetermined times.

Next, descriptions about a control mode in a case of a normal starting of the lamp by the microprocessor will be given below.

1. Normal Lighting Mode

The microprocessor generates waveforms, shown in FIGS. 2A and 2B, which are obtained from the transformed type of a White-Noise Modulation. Several waveforms are necessary for the transformed type of a White-Noise Modulation in the normal lighting mode. For this, several to several tens of waveforms with different periods and should be produced cyclically. For the stability of the flame, the frequency and the number of the waveforms should be determined based on the watts numbers of the lamp. In the generation of the waveforms with different periods, a signal generation skill that repeats one frequency several to several tens of times in a waveform corresponding to a period and then repeats another frequency in the same way is used to remove the audible noise.

Figure 5:
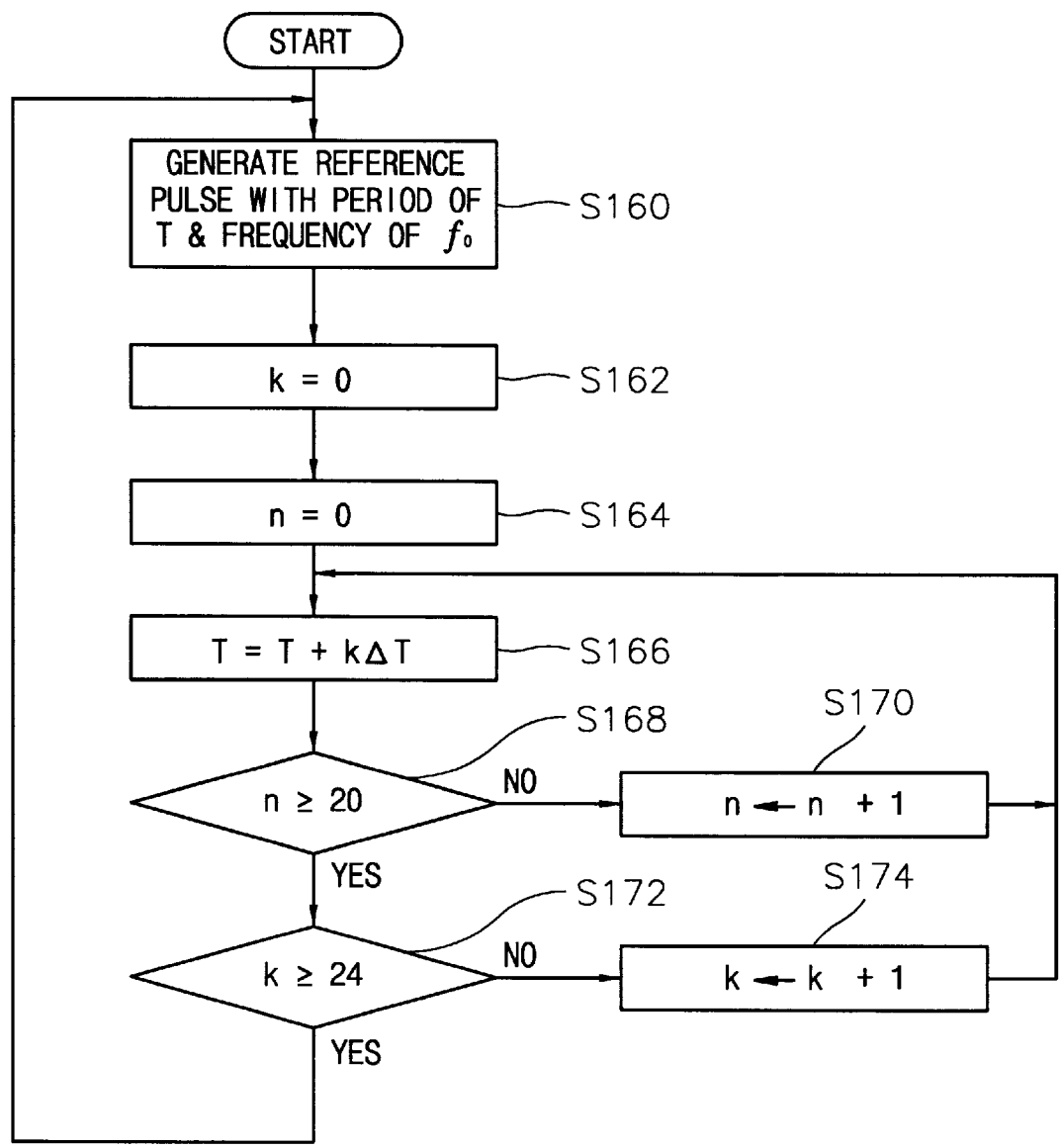
FIG. 5 is a flowchart for the explanation about a generating operation of a switching driving signal modulated in a way of a transformed type of a White-Noise Modulation according to the present invention.

Referring to FIGS. 5, 2A, 2B, the switching driving signal, whose period is T1 and whose frequency is f0, is generated as the reference pulse in step S160, both a frequency variable k and an identical period sustaining variable n are set to 1 in steps S162 and S164. In step S166, period T1 has no change in its value since variable k has 0. In step S168, it is checked whether variable n is equal to 20. If the value of variable n is less than 20, variable n has an increment of 1 in its value in step S170. Through the cyclic repetition of steps S165, S168 and S179 as above, the reference pulse with period T1 and frequency f0 is generated 20 times.

When the fact that the value of variable n, that is, occurring times of the reference signal with an identical frequency and an identical period, becomes equal to 20 is checked in step S168, it is checked whether the value of variable k is 24 or more in step S172 as a next step. If the value of variable k is below 24, variable k has an increment of 1 in its value.

As such, by means of changing the frequency 24 times in its value while the period has an increment of T at every time through the cyclic repetition of steps S166, S172 and S174, the switching driving signal which is modulated in the way of the transformed type of a White-Noise Modulation is generated.

If the fact that variable k has a value of 24 or more is checked, the whole steps are cyclically repeated with beginning step S160. Here, the values 20 and 24 of variables k and n are cited as examples and variables k and n can have other values within several to several tens according to the watt numbers of the discharge lamp.

2. Dimming Control Mode

In step S122 for the dimming control, a dimming change-over is checked. If a signal level of terminal B6 is high, then step S124 for the dimming control is to be implemented. If the signal level of terminal B6 is low, then a day & night light on/off control is to be implemented. When the dimming control mode is set, the transformed type of a white-noise modulated waveform is outputted, where the modulated waveform should be shifted in its frequency for the dimming control. For instance, if a maximum output of the white-noise modulated waveform is obtained under a condition that the frequency band of 30–40 Khz is divided into 24 division, the dimming control can be done by the lower output proportional to the frequency than the maximum output which can be obtained by generating the white-noise modulated waveform ranged 35–45 Khz in frequency in order to attenuate the output. The microprocessor receives the inputsignal for the dimming control in an analog form through terminal A0 and performs the dimming control by a program designed so that the output frequency has a correspondence with the voltage of the input signal.

3. ON/OFF Control in Day or Night

An ON/OFF control in day or night is performed based on a preset value of an input voltage to analog input terminal A1. The magnitude of the input voltage to terminal A1 is determined by a light receiving element whose resistance varies according to an ambient luminous intensity, where a voltage varying the characteristic of the light receiving element dependent on the resistance is used. In order to obviate such bad operations that the lamp is lighted on/off due to the ambient luminous intensity or due to the bad the lamp, variable k is initialized by assigning 10 to variable k.

4. Day Time Luminous Intensity Detection Dimming Control

A day time luminous intensity detection dimming control uses an identical input with the on/off control in day or night. In other words, the program is designed so that it can handle respective steps in accordance with level variations of the input voltage of terminal A1 dependent on the ambient luminous intensity. Thus, the dimming control in day time is automatically accomplished according to the ambient luminous intensity.

As can be known from the above descriptions, the present invention makes the switching driving signal in a digital way and detects an operating state of the ballast to perform a safety mode corresponding to the operating state by using the microprocessor so that the circuit of the present invention can be simplified and various protection modes can be easily designed.

According to the present invention, the flame fluctuation which is one of the discharge characteristics of the HID lamp, especially the metal halide lamp, and noises due to the acoustic-resonance is obviated so that a stable light-on operation of the HID lamp can be achieved. Particularly, there can be an occurrence of the audible high level noise when the white-noise modulated waveform is simply used, but the present invention can prevent the audible noise by extending the operating time of an identical frequency in the way repeating the identical frequency upon the waveform modulation several to several tens of times. The method using the white-noise modulated waveform can provide a more stable operation of the HID lamp than the previously mentioned methods, the square wave method or the frequency shift method, so that a problem due to various characteristics of the discharge lamps by manufacturers can be overcome. Consequently, the present invention has an advantage that the electronic ballast of the present invention can stably drive discharge lamps of any manufacturers.

Besides the advantages described above, the p resent invention allows the dimming control, the automatic light-on/off control during the day time and the night time, the automatic dimming control bas ed on the detection of the luminous intensity of an external ambient during the day time, the suppression of the inrush current and the stable starting of the lamp. Furthermore, the present invention can provide system protection functions such as the over-heat protection, the no-load protection, the low voltage protection, the light-on failure protection, the instant restarting protection, and the lamp on/off protection due to the bad lamp. As a result, power loss can be reduced and a life-time of the discharge lamp can be extended. Further, a weight of the ballast can be outstandingly reduced rather than the existing magnetic ballast.

While preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A method of driving a high-intensity discharge lamp, comprising the steps of:
   generating a switching driving signal of a predetermined frequency with k repetition times;
   changing the period of the switching driving signal with the predetermined frequency;
   performing the previous steps of generating and changing n numbers of times; and
   sequentially repeating the previous steps.

2. The method as claimed in claim 1, wherein the frequency takes a value within a range of several tens Khz to several hundreds Khz, and numeric values of integers k and n range from several to several tens.

3. An electronic ballast for a high-intensity discharge lamp, comprising:
   a power source circuit means for transforming an alternating current power source into a stepped-up direct current voltage;
   a half-bridge type inverting means, in response to a pair of switching driving signals, for switching the stepped-up direct current voltage so as to operate the high-intensity discharge lamp; and
   a digital controlling means for generating the pair of the switching driving signals, which have a predetermined dead time respectively within a switching-ON time interval of the switching driving signals and a phase difference of 180 degrees between them, in a way that frequencies of the pair of the switching driving signals are gradually shifted into some other stepped levels in turn within a predetermined bandwidth by a predetermined time interval and such a frequency shifting operation is cyclically repeated, the pair of the switching driving signals being supplied to the half-bridge type inverting means.

4. The electronic ballast for the high-intensity discharge lamp as claimed in claim 3, wherein the digital controlling means, in response to a dimming preset value, shifts the bandwidth.

5. The electronic ballast for the high-intensity discharge lamp as claimed in claim 3, wherein the predetermined time interval is a time interval taken for repeating a frequency with an identical period several to several tens of times and the number of the steps ranges from several steps to several tens of steps.

6. The electronic ballast for the high-intensity discharge lamp as claimed in claim 5, wherein the digital controlling means varies periods of the pair of the switching driving signals by the predetermined time interval for the gradual shift in frequency.

7. An electronic ballast for a high-intensity discharge lamp, comprising:
  a converting means for converting an alternating current power source into a direct current voltage;
  a boosting means for producing a boosted direct current voltage by boosting the direct current voltage;
  an auxiliary power source means, connected to the boosting means, for generating an operating voltage from the boosted direct current voltage during a starting operation of the high-intensity discharge lamp and for generating the second operating voltage which is stabilized during a normal operation;
  a half-bridge type inverting means, in response to a pair of switching driving signals, for switching the boosted direct current voltage to operate the high-intensity discharge lamp;
  a starting circuit means, connected to the half-bridge type inverting means, in response to a starting control signal, for making the high-intensity discharge lamp start with the boosted direct current voltage; and
  a digital controlling means, with receiving the operating voltage from the auxiliary power source means, for generating the starting control signal after starting the high-intensity discharge lamp so as to disable the starting circuit means, for generating, during a normal operation of the high-intensity discharge lamp, the pair of the switching driving signals, which have predetermined dead times between a switching-ON time interval of them and have a phase difference of 180 degrees between them, in a way that their frequencies are gradually shifted into some other stepped levels in turn within a predetermined bandwidth by a predetermined time interval and such a frequency shifting operation is cyclically repeated, to be supplied to the half-bridge type inverting means.

8. The electronic ballast as claimed in claim 7, wherein the electronic ballast further comprises a high voltage interrupting means which is provided between a ground line of the boosted direct current voltage and a ground line of the operating voltage supplied to the digital controlling means, in order to refrain a high voltage generated from the half-bridge type inverting means from being supplied to the digital controlling means.

9. The electronic ballast as claimed in claim 7, wherein the auxiliary power source means comprises a first power source means, inductively coupled with the boosting means, for providing a first power source voltage; a second power source means, inductively coupled with the boosting means, for providing a second power source voltage; and a driving power source means, in response to the starting control signal of the digital controlling means, with receiving the boosted direct current voltage during the starting operation of the high-intensity discharge lamp and with receiving the second power source voltage during the normal operation of the high-intensity discharge lamp, for providing the operating voltage for the digital controlling means.

10. The electronic ballast as claimed in claim 9, wherein the auxiliary power source means further comprises a power source interrupting means for making the second power source means and the driving power source means disable in response to a power source interrupting control signal from the digital controlling means.

11. The electronic ballast as claimed in claim 9, wherein the driving power source means further comprises a brown-out circuit means for interrupting outputs of the operating voltage when the operating voltage has a higher level than a reference voltage.

12. The electronic ballast as claimed in claim 9, wherein the half-bridge type inverting means comprises a pair of coupling capacitors serially connected with each other between the boosted direct current voltage and a ground; a pair of switching transistors serially connected with each other between the boosted direct current voltage and the ground; a high frequency transformer connected between a connection of the switching transistors and the high-intensity discharge lamp which is connected with a connection of the coupling capacitors; an inductor connected in parallel to the high intensity discharge lamp; a capacitor connected between a common connection of the pair of coupling capacitors and a common connection of the pair of switching transistors; a first driving circuit, with receiving the first power source voltage from the first power source means and one switching driving signal in a way of optical coupling, for driving one switching transistor between the pair of the switching transistors; and a second driving circuit, with receiving the second power source voltage from the second power source means and the other switching driving signal in the way of optical coupling, for driving the other switching transistor between the pair of the switching transistors be operated.

13. The electronic ballast as claimed in claim 7, wherein the digital controlling means comprises a light-on/off detecting means, having an inductive coupling with the half-bridge type inverting means, for detecting whether the high-intensity discharge lamp is lighted on or off; a temperature detecting means for detecting an temperature; a voltage level detecting means for checking whether a level of the operating voltage is equal to or higher than a predetermined level; a luminous intensity detecting means for detecting an ambient luminous intensity; a dimming controlling means for a dimming control; a dimming mode selecting means for selecting a dimming mode between automatic and manual dimming modes; and a microprocessor providing the pair of the switching driving signals and the starting control signal in response to results of the light-on/off detection, the temperature detection, the voltage level detection, the luminous intensity detection, the dimming control and the mode selection.

14. The electronic ballast as claimed in claim 13, wherein the microprocessor is turned to an inoperative state when the supplied operating voltage has a level lower than the predetermined level.

15. The electronic ballast as claimed in claim 13, wherein the microprocessor outputs the switching driving signal in an inrush current suppression and stable lighting mode until the high-intensity discharge lamp is successively started.

16. The electronic ballast as claimed in claim 13, wherein the microprocessor, in response to the dimming control, shifts a frequency band of the switching driving signal.

17. The electronic ballast as claimed in claim 13, wherein the microprocessor, in response to the ambient luminous detection, performs a light-on/off control of the high-intensity discharge lamp.

18. The electronic ballast as claimed in claim 13, wherein the microprocessor, in response to the mode selection, performs a dimming control of the high-intensity discharge lamp by means of the dimming control value set in the manual dimming mode and by means of the ambient luminous detection in the automatic dimming mode.

19. The electronic ballast as claimed in claim 13, wherein the microprocessor, in response to the light on/off detection, makes the auxiliary power source disable so as to interrupt power supply by the auxiliary power source on an occasion that starting of the high-intensity discharge lamp fails in spite of repetitive trials of starting within a predetermined time.

20. The electronic ballast as claimed in claim 13, wherein the microprocessor, in response to the light on/off detection, makes the high-intensity discharge lamp start again after a lapse of a necessary time for the high-intensity discharge lamp to be cooled when a instant power fails.

21. The electronic ballast as claimed in claim 13, wherein the microprocessor, in response to the light on/off detection, makes the auxiliary power source disable so as to interrupt power supply by the auxiliary power source on an occasion that light on/off numbers due to bad lamp of the high-intensity discharge lamp go beyond predetermined times after a normal starting of the high-intensity discharge lamp.

* * * * *